J. E. KESTER.
NON-SKIDDING DEVICE.
APPLICATION FILED FEB. 16, 1917.

1,249,969.

Patented Dec. 11, 1917.

Witnesses
H. N. Lybrand
J. C. Wilcox

Inventor
J. E. Kester
By Victor J. Evans
Attorney

UNITED STATES PATENT OFFICE.

JOHN E. KESTER, OF CURWENSVILLE, PENNSYLVANIA.

NON-SKIDDING DEVICE.

1,249,969. Specification of Letters Patent. Patented Dec. 11, 1917.

Application filed February 16, 1917. Serial No. 149,065.

*To all whom it may concern:*

Be it known that I, JOHN E. KESTER, a citizen of the United States, residing at Curwensville, in the county of Clearfield and State of Pennsylvania, have invented new and useful Improvements in Non-Skidding Devices, of which the following is a specification.

This invention relates to non-skidding devices especially adapted to be used upon automobiles and similar vehicles and it consists in the novel features hereinafter described and claimed.

An object of the invention is to provide a device of the character indicated which is of simple and durable structure and which may be easily and quickly applied to the wheel of an automobile for the purpose of preventing the same from skidding on smooth streets or surfaces.

With the above object in view the device includes a plurality of hook members of peculiar configuration adapted to be applied to the tire of the wheel, the said hook members having shank portions adapted to be attached to a ring which surrounds the axle or hub of the wheel.

In the accompanying drawing:—

Figure 1:
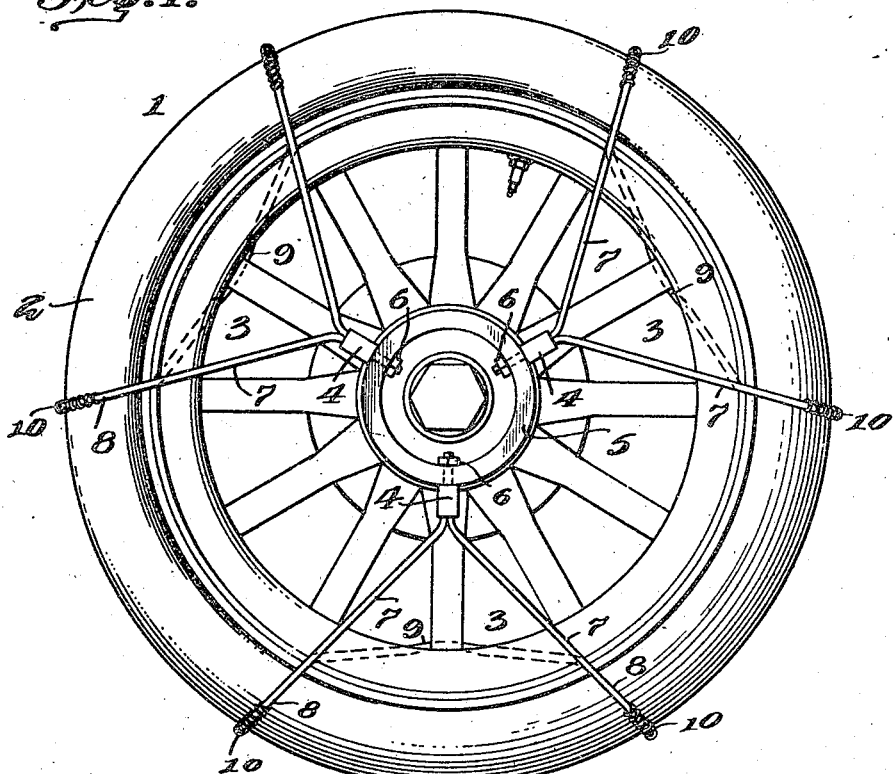
Figure 1 is a side elevation of a wheel showing the device applied.
Figure 2:
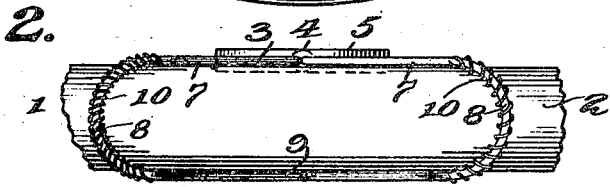
Fig. 2 is a fragmentary top plan view of the same.
Figure 3:
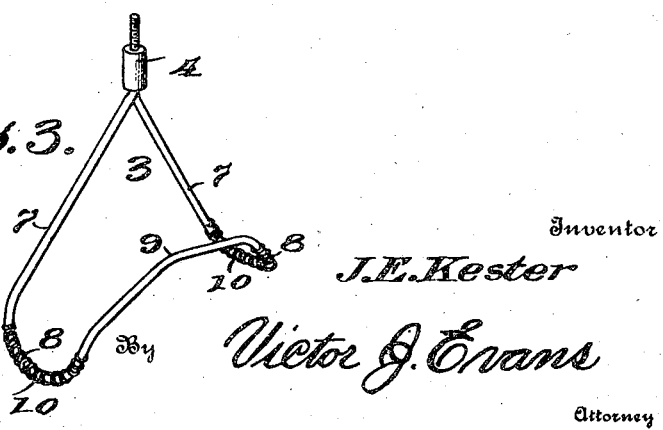
Fig. 3 is a perspective view of one of the hook members.

As illustrated in the accompanying drawing, the wheel 1 is of the usual pattern employed upon automobiles or similar vehicles and the said wheel is provided with a cushion tire 2 of conventional form. The non-skidding device comprises hook members 3 which are preferably formed from a heavy wire or rod. The members 3 are provided with shanks 4 which pass through a ring 5 and which are secured thereto by means of nuts 6 screwthreaded upon the inner ends of the said shanks and bearing at their outer faces against the inner surface of the ring 5. The ring 5 surrounds the axle or hub of the vehicle wheel.

Each hook member 3 from its shank 4 is provided with diverging arms 7 which continue into hooks 8 that extend around the outer surface of the tire 3. The hooks 8 of the same member 3 are connected together by a section 9 which prevents the said hooks from spreading with relation to each other. If desired a wire 10 may be wrapped around the hooks 8 and disposed beyond the outer surface of the tire 2.

In practice it is preferable to use three hook members 3 upon a wheel although it is to be understood that a greater or less number of the said members may be employed if desired.

From the foregoing description it will be seen that when the device is applied to the tire of a wheel that the said hooks will encounter the surface of the roadway as the wheel rotates and hence they will prevent the wheel from skidding or slipping.

Having described the invention what is claimed is:—

A non-skidding device comprising hook members, having diverging arms each of which is continued into a hook adapted to be applied to the tire of a wheel, a section connecting the ends of the hooks together, each hook member having a shank, a ring through which the shanks of the hook members pass and means for securing the shanks to the ring.

In testimony whereof I affix my signature in presence of two witnesses.

JOHN E. KESTER.

Witnesses:
M. A. NELSON,
FRED OSMER.